United States Patent [19]

Marschke et al.

[11] Patent Number: 5,873,974
[45] Date of Patent: Feb. 23, 1999

[54] COMPOSITE WEB MATERIAL

[75] Inventors: Carl R. Marschke; Harold D. Welch, both of Phillips, Wis.

[73] Assignee: Marquip, Inc., Phillips, Wis.

[21] Appl. No.: 726,151

[22] Filed: Oct. 7, 1996

[51] Int. Cl.$^6$ .................................................. B32B 31/00
[52] U.S. Cl. ..................... 156/297; 156/299; 156/302; 156/303; 428/77; 428/78
[58] Field of Search .................... 156/297, 299, 156/302, 303; 428/77, 78

[56] References Cited

U.S. PATENT DOCUMENTS

| | | | |
|---|---|---|---|
| 3,928,692 | 12/1975 | Pellegrino | 428/77 |
| 4,696,843 | 9/1987 | Schmidt | 428/77 |
| 4,983,438 | 1/1991 | Jameson | 428/77 |
| 5,290,379 | 3/1994 | Higgins | 156/280 |

OTHER PUBLICATIONS

Merriam –Webster's Collegiate Dictionary, Tenth Edition, 1996.

*Primary Examiner*—Nasser Ahmad
*Attorney, Agent, or Firm*—Andrus, Sceales, Starke & Sawall

[57] ABSTRACT

An industry standard width composite paper web includes one layer comprising a plurality of narrow web portions derived from trim rolls of paper which are laminated to a second carrier web of the selected standard width. In an alternate embodiment, the carrier web itself may comprise a plurality of narrow trim roll web portions. The web portions comprising each layer may be spaced from one another slightly, and the gaps between web portions in both layers must offset laterally with respect to one another to maintain composite web integrity.

7 Claims, 1 Drawing Sheet

COMPOSITE WEB MATERIAL

BACKGROUND OF THE INVENTION

The present invention relates to composite material webs and, more particularly, to a composite web of standard width made by joining a plurality of narrower width trim roll webs without a lateral overlap in the adjacent edges of the trim roll webs.

In the many processes of paper converting, standard width rolls of paper are often slit longitudinally to narrower widths for utilization in the manufacture of products requiring the narrower width paper. For example, a standard 96" (2400 mm) roll may be slit to provide a required 60" (1500 mm) web. This process to provide the required narrower width web leaves a 36" (900 mm) roll which is commonly referred to as a "trim roll". Unless there is a coincident requirement for a product utilizing a web width equal to the trim roll, the trim roll paper has little value and often such rolls are merely recycled. Trim rolls are, therefore, available on the open market at prices significantly below the price of standard width rolls.

Paper is the primary cost item in many if not most items produced in the paper converting industry, such as the manufacture of corrugated paperboard. Therefore, a process for utilizing trim roll paper in any paper converting process would be highly advantageous. However, the difficulty faced in adapting trim roll paper webs to converting processes is that production equipment is typically made to handle standard widths. Also, the availability of trim roll paper web materials is not dependable and it cannot be predicted with any certainty what trim roll widths will be available in a given area at a particular time.

It is known in the prior art to join the webs of two or more trim rolls by joining their adjacent lateral edges with an overlapping splice as shown in prior art FIGS. 1 and 2. Trim roll webs 10 and 11 are positioned with their adjacent edges 12 overlapping. Glue is applied to the adjacent edges in the area of the overlap to provide a longitudinal splice 13. This arrangement produces a web having a double thickness portion at the splice which makes such a web completely unsuitable for most converting operations, including most applications in the production of corrugated paperboard.

BRIEF SUMMARY OF THE INVENTION

In accordance with the present invention, a composite web includes two laminated web layers, one of which layers is formed from a plurality of discrete longitudinally extending, laterally adjacent web portions, which may be derived from trim roll stock; and, a second web layer which is laminated to and joins the first web portions. The second web layer preferably comprises an industrial standard width web and the first web portions are selected to provide a combined first web layer width which is approximately equal to that standard width. Preferably, the first web portions are positioned in the composite web with their adjacent lateral edges spaced apart not greater than about 1/16" (about 1.6 mm). Also, the first web portions are positioned in the composite web without any overlap in adjacent lateral edges of the web portions.

In one embodiment, the second web layer comprises a unitary carrier web having a thickness substantially less than the thickness of the first web layer. Alternately, the second web layer may comprise a plurality of discrete longitudinally extending, laterally adjacent second web portions. In this embodiment, the number and widths of the first and second web portions are selected to provide an industry standard width composite web, the outermost edges of the outermost of each of said first and second web portions are aligned, the spacing between adjacent lateral edges of respective first web portions and respective second web portions does not create a gap exceeding about 1/16" (1.6 mm), and the gaps in the layers are respectively offset laterally from one another. The first and second web portions are preferably derived from trim rolls of paper.

The present invention also contemplates a method for making a composite web which includes the steps of positioning a plurality of discrete longitudinally extending first web portions in parallel, laterally adjacent orientation to provide a first web layer of a selected width, and laminating the first web layer to a second web layer of the same selected width. The first web portion is preferably positioned such that adjacent lateral edges of adjacent first web portions are spaced not greater than about 1/16" (1.6 mm). The method may also include the step of positioning a plurality of discrete longitudinally extending second web portions in parallel laterally adjacent orientation to provide said second web layer.

In a variant method for making a standard width composite paper web, the steps include selecting a plurality of trim rolls of paper web having combined widths approximately equal to said standard width; positioning the webs from said trim rolls to extend longitudinally and in parallel laterally adjacent orientation; and laminating each of said trim roll webs to a carrier web of approximately said standard width.

DETAILED DESCRIPTION OF THE INVENTION

Figure 1:
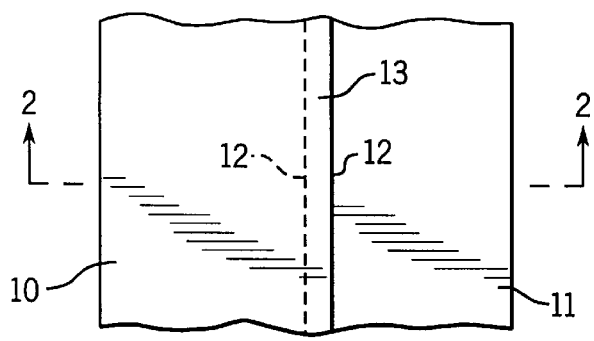
FIG. 1 is a top plan view of a composite prior art web comprising two spliced web portions.
Figure 2:
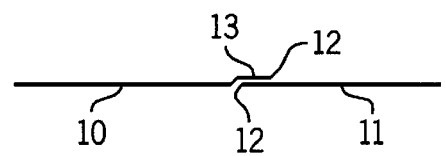
FIG. 2 is a lateral section through the web taken on line 2—2 of FIG. 1.
Figure 3:
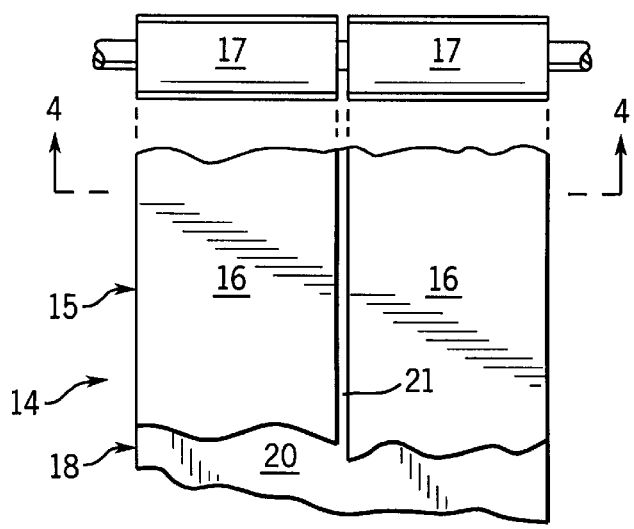
FIG. 3 is a top plan view of a composite laminated web in accordance with the present invention.
Figure 4:
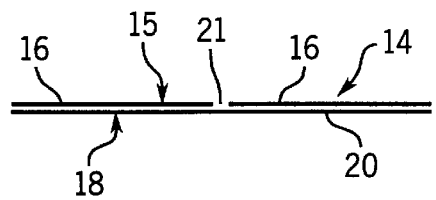
FIG. 4 is a lateral cross sectional view taken on line 4—4 of FIG. 3.

Referring to FIGS. 3 and 4, a composite web 14 in accordance with the present invention includes a first layer 15 comprised of two separate first web portions 16, each of which is derived from a trim roll 17 of paper. Web portions 16 are laminated to a second web layer 18 which, in this embodiment, comprises a unitary carrier web 20. The laminating may be carried out by any well known process, utilizing suitable adhesives.

The trim roll paper comprising the first web portions 16 may be standard kraft paper of a type commonly used for the liner or medium webs in the formation of corrugated paperboard. The trim roll web portions 16 may be of different widths, but must be of the same caliper or thickness. The carrier web 20 is a lightweight, low cost paper having a substantially smaller caliper than the trim roll web portions 16. The carrier web caliper may be, for example, 0.003" (0.076 mm). The carrier web width is selected to an industry standard size, e.g. 60" to 96" in 12" increments. The trim roll web portions have a combined width equal to or just slightly less than the standard width of the carrier web 20. Preferably, the combined widths of the web portions 16 should, when the outer edge portions of the webs 16 are aligned with the outer edges of the carrier web 20, leave a gap 21 between the web portions 16 of not more than about 1/16" (1.6 mm).

Figure 5:
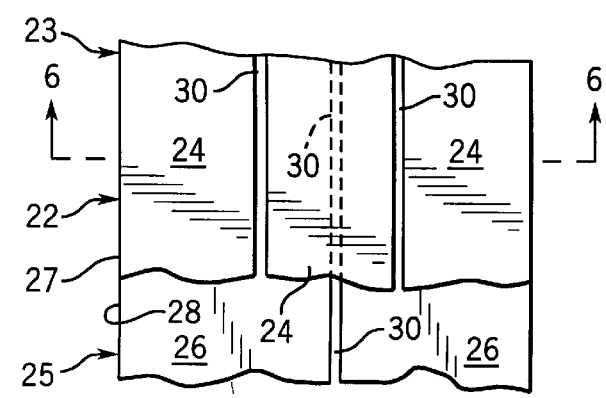
FIG. 5 is a top plan view of an alternate embodiment of a composite laminated web in accordance with the present invention.
Figure 6:
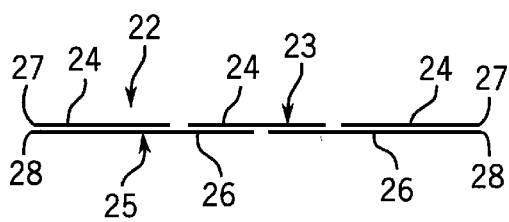
FIG. 6 is a lateral cross section taken on line 6—6 of FIG. 5.

An alternate embodiment of the composite laminated web of the present invention is shown in FIGS. 5 and 6. This composite web 22 includes a first web layer 23 which comprises three first web portions 24. Each of the first web portions 24 is derived from a trim roll of paper (not shown) in a manner similar to the embodiment of FIGS. 3 and 4. A second web layer 25 is comprised of two second web portions 26, each of which is also derived from trim rolls (not shown) in a manner previously described. The web portions 24 and 26 comprising the respective layers 23 and 25 are selected to provide an industry standard width composite web 22 when oriented as shown in the drawing. Thus, the outer edges 27 of the two outermost first web portions 24 are aligned with the outer edges 28 of the second web portions 26, and the two layers are laminated with a suitable glue and process in a manner similar to the preceding embodiment. The web portions 24 and 26 are also selected from widths which will result in gaps 30 between adjacent web portions which do not exceed about 1/16" (1.6 mm). The widths of the web portions 24 and 26 must also be chosen to avoid any layer 23-to-layer 25 alignment of gaps 30 which would of course preclude complete lamination of the composite web. Furthermore, the gaps should be sufficiently offset laterally from one another to preclude any adverse effects on the structural integrity of the composite web 22.

We claim:

1. A method for making a continuous composite paper web having a paper industry standard width comprising the steps of:
   (1) positioning a plurality of continuous longitudinally extending webs from a plurality of first paper web trim rolls in parallel laterally adjacent orientation to provide a first web layer of a standard selected width and uniform caliper;
   (2) selecting a second paper web of said standard width and a caliper substantially less than that of said first web layer; and,
   (3) laminating said first web layer to said second paper web.

2. The method as set forth in claim 1 wherein the webs from said first web trim rolls are positioned such that adjacent lateral edges thereof are spaced not greater than about 1/16" (1.6 mm).

3. The method as set forth in claim 1 including the step of positioning a plurality of continuous longitudinally extending webs from second paper web rolls in parallel laterally adjacent orientation to provide said second web.

4. A method for making a standard width continuous composite paper web for use in the paper converting industry comprising the steps of:
   (1) selecting a plurality of trim rolls of paper web having the same caliper and combined roll widths approximately equal to said standard width;
   (2) positioning the webs to extend continuously from said trim rolls longitudinally and in parallel laterally adjacent orientation; and,
   (3) laminating each of said trim roll webs to a lightweight paper carrier web of a caliper less than that of said trim roll webs and of said standard width.

5. The method as set forth in claim 4 wherein said carrier web comprises a unitary web having a caliper substantially less than the caliper of said trim roll webs.

6. The method as set forth in claim 4 wherein said carrier web comprises a plurality of continuous longitudinally extending laterally adjacent carrier webs.

7. The method as set forth in claim 6 including the steps of selecting the number and the widths of said trim roll webs and said carrier webs to provide an industry standard width composite web; aligning the outer edges of the outermost of each of said trim roll webs and said carrier webs; providing a spacing between adjacent lateral edges of the respective trim roll webs and the respective carrier webs to preclude gaps exceeding about 1/16" (1.6 mm); and orienting the webs prior to laminating such that the resulting gaps between said trim roll webs and between said carrier webs are respectively offset laterally from one another.

* * * * *